Figure 1:
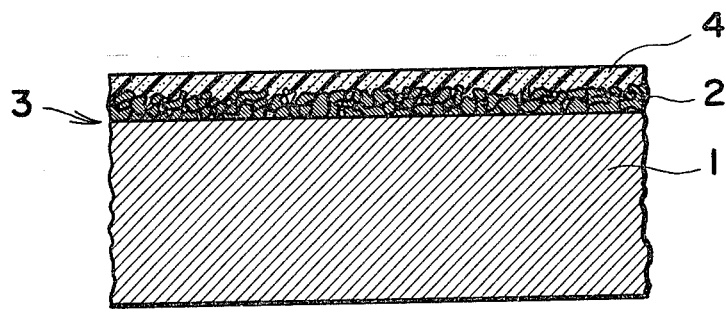

United States Patent [19]

Cho et al.

[11] 4,208,472

[45] Jun. 17, 1980

[54] COMPOSITE BEARING MATERIAL AND METHOD OF MAKING THE SAME

[75] Inventors: Hideo Cho, Zama; Yukinori Takenoshita, Shiga; Saisuke Sugimoto, Kusatsu, all of Japan

[73] Assignee: Oiles Industry Co., Ltd, Tokyo, Japan

[21] Appl. No.: 941,262

[22] Filed: Sep. 11, 1978

[30] Foreign Application Priority Data

Sep. 19, 1977 [JP] Japan .................... 52-111631

[51] Int. Cl.² .............. B21D 53/10; F16C 33/28; B32B 15/16
[52] U.S. Cl. .................... 428/550; 29/149.5 NM; 29/149.5 PM; 308/DIG. 8; 427/264; 427/369; 427/370; 427/373; 428/158; 428/256; 428/269; 428/327; 428/336; 428/339; 428/422
[58] Field of Search ............... 428/409, 422, 457, 550, 428/551, 565, 639, 158, 256, 269, 327, 336, 339; 308/DIG. 8; 29/149.5 NM, 149.5 PM; 427/264, 369, 370, 373

[56] References Cited

U.S. PATENT DOCUMENTS

| 2,813,041 | 11/1957 | Mitchell et al. | 427/194 |
| 2,995,462 | 8/1961 | Mitchell et al. | 428/550 |
| 3,136,680 | 6/1964 | Hochberg | 428/422 X |
| 3,198,691 | 8/1965 | Thomas et al. | 428/422 X |
| 3,416,941 | 12/1968 | Mizuno | 427/376 R |
| 3,419,414 | 12/1968 | Marks | 428/409 X |
| 4,000,982 | 1/1977 | Ueda | 428/545 |
| 4,152,474 | 5/1979 | Cook | 428/422 X |

FOREIGN PATENT DOCUMENTS 31-2452 2/1956 Japan .
39-16950 1/1964 Japan .
41-1868 8/1966 Japan .

Primary Examiner—Harold Ansher
Attorney, Agent, or Firm—Stevens, Davis, Miller & Mosher

[57] ABSTRACT

In a composite bearing material including a metal strip, a porous sintered metal matrix layer bonded to a surface of said metal strip and a resin composition impregnated into and substantially filling the voids in said porous metal layer and forming a continuous surface layer thereon, the resin composition consists essentially of a blend of 60 to 95 percent by weight of polytetrafluoroethylene and 40 to 5 percent by weight of a copolymer of tetrafluoroethylene and hexafluoropropylene, and mostly all of the copolymer in the composition is included in the surface layer in the form of a fibrillated network.

12 Claims, 2 Drawing Figures

COMPOSITE BEARING MATERIAL AND METHOD OF MAKING THE SAME

This invention relates to a composite bearing material and a method of making the same.

More specifically, this invention relates to a composite bearing material including a backing metal composed of a thin strip such as steel provided with a porous sintered metal matrix layer which is impregnated with a resin composition comprising a mixture of tetrafluoroethylene resin (hereinafter referred to as PTFE) and tetrafluoroethylene-hexafluoropropylene copolymer (hereinafter referred to as FEP) and deposited with a thin layer of said resin composition, and further concerns a process for making efficiently the above composite bearing material which comprises the steps of continuously supplying the above resin composition in somewhat wetted powder form to the above backing metal, pressing the same between rollers, and then further pressing the same under heating.

In the prior arts, composite bearing materials including a steel backing strip having a porous sintered metal matrix layer impregnated with fluoro resin, in particular, PTFE or filler-incorporated PTFE are known as disclosed, for example in Japanese Patent Publication Nos. 2452/1956, 16950/1964 and 1868/1966, as well as in U.S. Pat. Nos. 2,813,041, 2,955,462, 3,416,941 and 4,000,982.

These composite bearing materials in the prior arts are known to have low coefficients of friction under various working conditions and perform satisfactorily. But the resin layer thereon forms a very thin sliding surface, which causes problems as bearing durability is still somewhat insufficient and it becomes difficult to fabricate the composite bearing material of correct resin film thickness through impregnation and deposition. Thus highly skilled techniques are necessary.

In overcoming the foregoing problems, although various developments have been made for substituents including various types of resin, or for the composite bearing materials incorporated with fibrous filler, graphite, molybdenum disulfide, lead compounds and the like with the aim of reinforcing the deposited resin film, the above problems have not yet been solved in most cases.

Moreover, since the resin layer deposited over the porous sintered metal layer is very thin, usually, in the order of about 0.01–0.10 mm, the underlying porous layer can be seen through the resin layer. This visibility of the underlying porous layer through the resin layer is usually considered as a defect rather than a merit for commercial goods.

Since it is an actual practice in treating this kind of composite bearing to weigh the resin layer that forms a sliding surface rather than the material forming the backing metal strip, a delicate difference in the tone of the underlying porous sintered composite metal layer is liable to be mistaken for that of the deposited resin itself, which often leads to unnecessary trouble and confusion. In order to avoid such problems, a coloring agent is intentionally added to the resin used. Alternatively, a filler employed for some other purpose may display a coloring effect and unintentionally serve the purpose of coloring or masking the products.

In fluoro resins such as PTFE, however, most of the fillers for plastics, e.g., graphite, molybdenum disulfide or other metal sulfides, or oxides used as lubricating filler often give a deleterious effect to the low frictional property inherent to PTFE, although they may some time contribute to the improvement in the wear resistance of the resin layer.

An object of this invention is to provide a low frictional composite bearing material both excellent in wear resistance and load carrying capacity comprising a thin metal strip such as of steel having a porous sintered metal layer provided thereon impregnated with a resin composition consisting of a mixture of PTFE and FEP in a predetermined ratio and deposited evenly with a thin layer of a part of the resin composition over the porous layer.

Another object of this invention is to provide a composite bearing material having a thin resin layer containing no fillers other than fluoro resin and colored naturally opaque by itself upon baking of the fluoro resin.

A further object of this invention is to provide a composite bearing material showing excellent bearing performances particularly when used in the presence of water, oil and the like.

A still further object of this invention is to provide a method of making a desired bearing material which comprises the steps of incorporating a volatilisable liquid into a mixture of PTFE powder and FEP powder of a predetermined mixing ratio in such an extent as not impairing the powder like behavior of the mixture to thereby wet the mixture, continuously supplying the wetted powder mixture spreading the same over a backing metal composed of a thin strip such as of steel having provided thereon with a porous sintered metal layer, then applying a pressure to the resin powder thus spreaded by rollers to impregnate the same into the porous layer, and, at the same time, partially deposit the same over the porous layer as a thin film, and heating and then rolling the same to efficiently obtain a desired bearing material.

As the metal strip to be used in this invention, rolled steel strips for general structure use are employed, but rolled strips for other uses and metal strips other than the steel can be used depending on the end uses. While it is particularly desired in this invention to use continuous strips provided as hoop material from a coiled sheet, the strips are not always restricted to such a continuous form, but may be cut in an adequate length. These strips may be plated if necessary.

A porous sintered metal layer is provided in a known manner on the strip to form a backing metal. For metals constituting the porous layer, are used those which are excellent per se in the antifriction property and wear resistance such as copper alloy, for example, bronze, lead bronze or phosphor bronze and the like but the metals other than the copper alloy such as aluminum alloy, iron and the like can also be used depending upon the purposes.

In the porous sintered metal layer, intense bonding is necessary between each of the alloy powder and between the porous layer and the metal strip, and the porous layer should have a constant depth and a requisite porosity. The thickness of the porous layer is generally between 0.15–0.40 mm and, desirably, 0.20–0.30 mm, and the porosity is generally above 10 vol% and, desirably, between 15–40 vol%. The average pore size of the voids is usually between 10 and 70μ.

The powder-like fluoro resin composition according to this invention to be impregnated and deposited to the above porous sintered metal layer has various advantageous features in combination in that it has a low coefficient of friction inherent to PTFE while improved in its insufficient wear resistance and depositing property by addition of FEP which are considered as few defects of PTFE, as well as in that it can be automatically supplied smoothly upon its feeding to the backing metal, impregnated into the porous layer and evenly spreaded to form a uniform thin layer over the porous metal layer under a pressure given by rollers in the impregnation and deposition step without requiring particular devices and with ease.

In the resin composition of this invention, the PTFE component consists of fine particles having a sufficiently smaller particle diameter than average pore size of the voids in the porous sintered metal layer and, on the other hand, the FEP component consists of particles having a sufficiently larger average particle diameter than the above average pore size. Upon impregnation and deposition of the resin composition, most of its FEP component therefore remains on the surface of the porous sintered metal layer, which forms under a pressure a fibrillated network to provide a surface layer intensely deposited on the porous sintered layer.

It is accordingly essential in this invention to set the average particle size of each of the fluoro resin components as above in the resin composition.

Since the PTFE fine powder tends to coagulate into blocks when locally applied with an external pressure upon storage and handling, a particular care has to be taken therefor, but inclusion of the FEP powder into the PTFE fine powder followed by agitation can improve this defect that the fine powder, if alone, tends to form blocks and the powder characteristics as the entire blend are significantly enhanced.

In carrying out this invention into effect according to one embodiment, three types of fluoro resins are used, that is, two different types of PTFE and, in addition, FEP powder which is a fluoro copolymer resin.

One of the PTFE powder is a fine powder less than several $\mu$ in diameter referred to as PTFE fine powder, for example, Tefulon powder available from Mitsui Fluoro Chemicals.

The other of the PTFE powder is used in the form of an aqueous dispersion. That is, an aqueous Tefulon dispersion consisting of fine colloidal Tefulon particles 0.1$\mu$ in average particle diameter dispersed, for example, available from Mitsui Fluoro Chemical. While various concentration of dispersions are commercially available, those having from 35 to 60 %wt solid content and, in particular, from 50 to 60 %wt solid content are recommended.

Other fluoro resin, that is, FEP is a copolymer of tetrafluoroethylene and hexafluoropropylene which is disclosed in U.S. Pat. No. 2,946,763 (1961).

The fluoro resin above referred to is commercially available from Du'pont as "TEFULON 100 and TEFULON 110", "TEFULON FEP" from Mitsui Fluoro Chemical being one of the equivalents. Their specific gravity is between 2.12–2.17 and shore hardness is D 55. Melting points of TEFULON 100 is between 285°–295° C. and of TEFULON 110 is at 275° C.

FEP has a good moldability, excellent bonding property and, in particular, more excellent in wear resistance as compared with PTFE but its coefficient of friction is a little higher than that of PTFE.

In this invention, the particle size of the FEP powder used is such as passing 60 mesh and, desirably, 100 mesh but not passing 200 mesh sieve.

Inclusion and admixture of the aqueous PTFE dispersion with the above mixture, controls the PTFE to FEP ratio and wets the composition.

With an aim of adjusting the wetness in the composition and improving the expandability of the composition on the backing metal after spreaded thereon, an organic solvent is simultaneously used in this invention, and with an aim of enhancing the uniformity and the expandability of the resin composition, as well as for the natural color development in the resin layer upon hot rolling formed through deposition on the porous layer, a surface active agent is also added.

It is particularly important in this invention to provide a moderate wetness to the resin powder.

The degree of the wetness has to be such as not to impair the powderous behavior of the resin composition. It is, for example, such that the resin composition charged in a hopper can automatically fall through a fine gap formed in the bottom of the hopper with its fluidizing property as powder and can be smoothly spreaded on the backing metal with no sticking at all.

The resin composition sprayed on the backing metal is directly rolled between rollers at an ambient temperature to be impregnated into and deposited on the porous sintered layer, whereby the liquid providing the wetness should not be squeezed out under roller pressure from the resin composition and flown out.

With an excessively low wetness, the resin composition less extends over the backing metal to provide a difficulty in forming a thin resin layer of a uniform thickness.

With an excessively high wetness, the resin composition sticks to the hopper wall making it impossible for its automatic supply and spreading.

If a highly wetted resin composition is supplied by way of a supplying device such as an extruder to the backing metal, liquid will not only be squeezed out under the pressure of the rollers, but also contaminate the rolling rollers to impair the uniformity of the deposited films, require an additional heat capacity for its evaporation and further cause a loss in the close adherance of the deposited film. When the wetting liquid is squeezed to flow out, this causes the foregoing operational problems, as well as results in further significant problems as below mentioned in this invention.

The liquid flow out is accompanied with the flowing out of the surface active agent contained in the composition, and since this is not uniform throughout the longitudinal direction of the back metal, it results in uneven color development upon baking of the resin layer.

The inventors, as the results of various experiments, could attain desired composite bearing materials by using resin compositions of the formulations shown in Table 1.

Table 1

| Formulation of resin composition | % wt | Remarks |
| --- | --- | --- |
| PTFE | | |
| PTFE fine powder | 42–78 | dispersant: water* |
| PTFE dispersion | 10–30 | PTFE solid: 60% wt |
| FEP | 5–40 | |
| Organic solvent | 6–21 | |
| Surface active agent | 1–3 | |

*The dispersant contains 3.5% wt non-ionic surface active agent to the total dispersion.

Referring exclusively to the PTFE and FEP components in the resin composition, it is desired to set the component ratio as 60-95%wt PTFE to 5-40 %wt FEP, and, in particular, 70-90 %wt PTFE to 10-30 %wt FEP.

The total amount of the volatilisable liquids which wet the resin composition, that is, water in the PTFE dispersion and the organic solvent should not be in excess of 25 %wt to the total resin composition. With the amount of the volatilizable liquids in excess of 25 %wt, the composition is wetted excessively and no more shows behavior as powderous body to result in problems such as sticking to the vessel wall.

According to the inventors' experiments, it has been confirmed that 15-25 %wt, in particular, 18-22 %wt of the volatilisable liquid to the total composition is most desired.

Such organic solvents are desired that are present in liquid state under a usual treating atmosphere temperature and evaporated out at the baking temperature between 320°-400° C. for the resin composition. Those usable include aromatic hydrocarbons such as toluene, xylene and the like, paraffinic hydrocarbons having carbon atom number from $C_8$ (for example octane) to $C_{15}$ (for example pentadecane) or aliphatic alcohols having carbon atom number from $C_4$ to $C_{10}$.

Highly volatilisable organic solvents such as low boiling benzen, hexane, iso-propylalcohol and the like are not recommended since these liquids are easily evaporated out from the resin composition at an ambient temperature.

It is recommended to store the resin composition of this invention in a selaed container for a long storage since the composition is wetted by the volatilisable liquid. One of the features of this resin composition is that if the volatilisable liquid escapes through evaporation to lower the wetness in the composition, the composition will restore its original adequate wetness with ease by the addition of the organic solvent.

This feature of the easy re-adjustment for the wetness is attributable to that the aqueous PTFE dispersion constituting the resin composition is contained in the composition in a relatively small ratio as low as 10-30 %wt (as 60 %wt solid content). Although it seems desired to use more amount of the aqueous PTFE dispersion in the composition with a view that the dispersion has a good impregnation and deposition properties, the adequate ratio of the aqueous dispersion in the composition is very important, because if the wetness of a composition having the dispersion in excess of a predetermined ratio has once been decreased, its re-adjustment becomes very difficult to results in disadvantages such as losses in the expandability and impregnation property of the resin composition under the pressure of rollers even if it resumes its certain apparent wetness.

Preferred surface active agent includes anionic or non-ionic surface active agent having carbon atom number 12 or more and it is added to the resin composition in an amount from 1 to 3 %wt. Since the surface active agent is also contained in the PTFE dispersion by about 3.5 %wt, the total amount of the surface active agent in the composition is between 1-5% and, especially, between 1.35-4.1 %wt.

2-3 %wt of the surface active agent is particularly preferred.

The use of the surface active agent improves the wetting property of the volatilisable liquid in the resin composition and enhances the impregnation and extension of the composition upon roller rolling, but its role for the addition will generally be exhausted after the impregnation and deposition to the composition has been completed.

The anionic or non-ionic surface active agent having 12 or more carbon atoms is considered to carburize upon baking of the impregnated and deposited resin composition thereby causing the resin to develop color in brown black in this invention.

Remarkable color developing effect has been attained with the surface active agent contained in the composition by at least 1.35 %wt, desirably, above 1.5 %wt and more desirably above 2.0 %wt.

Figure 2:
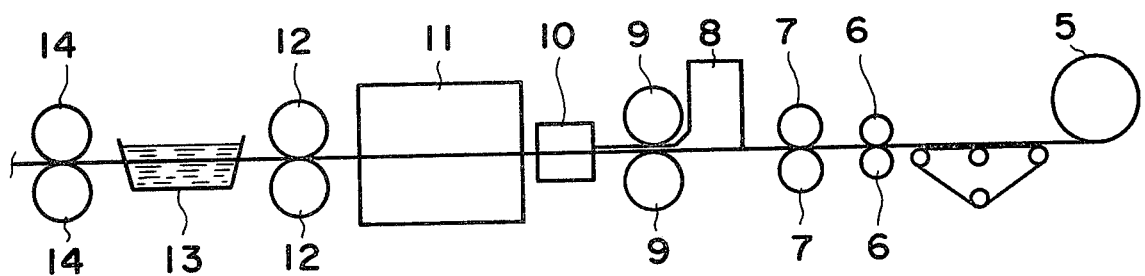
Figure 2:
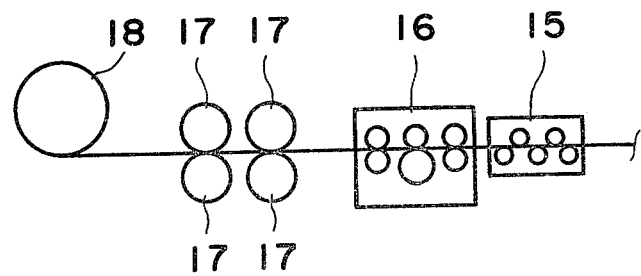

An understanding of the invention may be facilitated by reference to the accompanying drawings in which:

FIG. 1 is an enlarged cross section of a composite bearing of this invention; and FIG. 2 is a explanatory view showing the apparatus for the production of the composite bearing.

Referring to FIG. 1, a strip 1 made of a thin metal sheet such as of steel and a porous sintered metal layer 2 provided on the strip 1 form a backing metal 3 for a composite bearing material.

Fluoro resin 4 forming the sliding surface of the composite bearing material is impregnated into the voids in and deposited on the surface of the porous metal layer of the backing metal.

The thickness of the thin resin layer deposited on the porous surface is from 0.01 to 0.10 mm and, desirably, from 0.02 0.05 mm.

In FIG. 2, an uncoiler 5 is shown which supplies the strip backing metal 3 to the apparatus. In the figure, are also shown guide rollers 6, adjusting rollers 7 for the porous sintered metal layer, a hopper 8 for storing the resin composition and supplying it onto the backing metal 3, milling rollers 9 for pressing the resin composition spreaded on the backing metal at ambient temperature to impregnate and deposit the same to the porous metal layer and a hot air drying furnace 10.

The volatilisable liquid in the resin composition is evaporated out substantially completely in the hot air drying furnace 10.

A heating furnace 11 for baking the resin is adjusted to atmospheric temperature generally between 400°-450° C. although depending upon the feeding speed of the backing strip, and the strip passed through the heating furnace is generally heated to about 320°-400° C.

Hot forming rollers 12 press the baked resin leaving the heating furnace 11, during which impregnation of the resin into the voids of the porous layer is proceeded additionally, while at the same time, the deposited resin film is set to a predetermined and even thickness. The hot forming rollers 12 are water cooled from inside thereof for temperature adjustment.

A cooling tank 13, feed rollers 14 reforming rollers 15, a cleaning device 16 for the resin-deposited strip and cold forming rollers 14 are also provided.

The cold forming rollers 17 perform fine adjustment for the thickness of the composite strip and when the strip passed through the cold forming rollers 17 is taken up around a coiler 18, the impregnation and deposition step for the resin is completed.

While the strip impregnated and deposited with the resin can be cut into an adequate length and used as such, in a plate-like shape, for the composite bearing, for example, sliding plates, the strip cut into the predetermined length is generally rolled into a cup- or a cylindrical shape with the resin deposited layer on its inside for use with ball sheets for ball joint, bushes or the likes.

The composite bearings according to this invention show excellent performances under so-called dry friction in a low load region with no supply of lubricant at all, and they particularly display excellent performances both for the coefficient of friction and the wear resistance in a medium load condition, for example, in excess of 50 kg/cm² and a high load condition in excess of 100 kg/cm² at the presence of water or oil.

Test Example

Table 2 shows the results of the friction and wear tests in oil regarding conventional composite bearings prepared by impregnating and depositing PTFE which contains soft metal dispersed therein into a backing metal having a porous sintered metal layer and composite bearings according to this invention.

Test Conditions:
  Test specimen size:
    inside diameter: 15 mm,
    outside diameter: 18 mm,
    length: 18 mm
  Load: 60 kg/cm²
  Sliding speed: 40 m/min (swinging movement)
  Mating material: Hard chromium-plated carbon steel for machine structural use
  Lubricant: Mineral oil Table 2

| Test specimen | Coefficient of static friction | Coefficient of dynamic friction | Amount of wear (mm) |
| --- | --- | --- | --- |
| Prior products | 0.055–0.085 | 0.040–0.041 | 0.010 |
| Invented products(A) | 0.035–0.083 | 0.038–0.034 | 0.010 |
| Invented products(B) | 0.036–0.045 | 0.033–0.035 | 0.010 |

The PTFE:FEP ratio is 8:2 in the invented products (A) and 7:3 in the invented products (B). While the latter has a coefficient of static friction and a coefficient of dynamic friction slightly higher than those of the former, the coefficient of friction in both of them are lower than those in the prior art products.

The invented products, although not containing soft metal which is effective to the improvement in the wear resistance and the formation of the lubricating film as in the prior art products, they are quite equal to the latter products with respect to the wearing amount.

The above advantageous effect is considered to due to the effect of FEP blended as a fluoro resin in PTFE. The FEP powder, when ground or intensely stirred, is fibrillated. The FEP powder has a much greater particle size as compared with the PTFE fine powder and the solids in the PTFE dispersion in this invention.

As stated above, the FEP used in this invention is the FEP powder which can pass 60 mesh, desirably, 100 mesh and does not pass 200 mesh sieve and desirable range of its particle size corresponds to 70–150μ. The FEP powder of such a great particle size, different from the solid content in the PTFE dispersion and the fine powder, is not impregnated into pores of the porous layer of the backing metal and entirely deposited as a thin film on the porous layer.

Since the thin film generally has a thickness between 0.02–0.05 mm, that is, between 20–50μ, the FEP powder after rolled between the rollers is present in the thin layer while deformed by an intense pressing.

As the result of a microscopic observation, it has been confirmed that the FEP is fibrillated and entagled to each other into a network and present in the thin film.

The FEP thus fibrillated and entangled to each other into the network is considered to protect PTFE in the network and contributes to the improvement in the wear resistance.

Accordingly, the resin layer of this invention has a coefficient of friction slightly higher than that of the resin layer deposited only with PTFE but lower than that of the PTFE resin layer containing soft metal dispersed therein, and its wearing amount is comparable with that of the resin layer containing soft metal dispersed therein.

As stated above, the composite bearing materials according to this invention have advantageous features that they contain no fillers other than the fluoro resins, and are easy to fabricate and excellent antifriction property and wear resistance.

What is claimed is:

1. In a composite bearing material including a metal strip, a porous sintered metal matrix layer bonded to a surface of said metal strip and a resin composition impregnated into and substantially filling the voids in said porous metal layer and forming a continuous surface layer thereon; the improvement which comprises: said resin composition consists essentially of a blend of 60 to 95 percent by weight of polytetrafluoroethylene and 40 to 5 percent by weight of a copolymer of tetrafluoroethylene and hexafluoropropylene, and mostly all of the copolymer in said composition is included in the surface layer in the form of a fibrillated network.

2. The composite bearing material as recited in claim 1 in which said resin composition consists essentially of a blend of 70 to 90 percent by weight of polytetrafluoroethylene and 30 to 10 percent by weight of a copolymer of tetrafluoroethylene and hexafluoropropylene.

3. The composite bearing material as recited in claim 1 or 2 in which the continuous surface resin layer formed on the surface of said porous metal layer has a thickness of 10 to 100μ, preferably, of 20 to 50μ.

4. The composite bearing material as recited in any one of claims 1 to 3 in which said porous metal layer has a thickness of 0.15 to 0.40 mm, preferably, of 0.20 to 0.30 mm and a porosity of more than 10 percent by volume, preferably, of from about 15 to about 40 percent by volume.

5. In a composite bearing material including a metal strip, a porous sintered metal matrix layer bonded to a surface of said metal strip and a thin resin layer formed by impregnating and pressing a resin composition into the pores of said porous metal layer and followed by sintering the thus pressed resin composition in a heating furnace; the improvement which comprises: said resin composition comprises a uniform blend of 60 to 95 percent by weight of a polytetrafluoroethylene having an average particle size less than the average pore size of the voids in said porous metal layer and complementally therewith 40 to 5 percent by weight of a hexafluoropropylene-tetrafluoroethylene copolymer having an average particle size more than the average pore size in said porous metal layer.

6. The composite bearing material as recited in claim 5 in which the average pore size in said metal layer is in the range of about 10 to about 70μ.

7. The composite bearing material as recited in claim 5 or 6 in which the particle sizes of the copolymer in the blend is in the range of 70 to 150μ.

8. The composite bearing material as recited in any one of claims 5 to 7 in which said resin composition comprises a umiform blend of 70 to 90 percent by weight of polytetrafluoroethylene and complementally therewith 30 to 10 percent by weight of the hexafluoropropylene-tetrafluoroethylene copolymer.

9. The composite bearing material as recited in any one of claims 5 to 8 in which the continuous surface resin layer formed on the surface of said porous metal layer has a thickness of 10 to 100μ, preferably of 20 to 50μ.

10. The composite bearing material as recited in any one of claims 5 to 9 in which said porous metal layer has a thickness of 0.15 to 0.40 mm, preferably, of 0.20 to 0.30 mm and a porosity of more than 10 percent by volume, preferably, of from about 15 to about 40 percent by volume.

11. The composite bearing material as recited in any one of claims 5 to 10 in which said resin composition consists essentially of a uniform blend of 42 to 78 percent by weight of polytetrafluoroethylene fine powder having an average particle size less than 6μ, 5 to 40 percent by weight of powder of hexafluoropropylene-tetrafluoroethylene copolymer having an average particle size of 70 to 150μ, 10 to 30 percent by weight of aqueous dispersion of colloidal polytetrafluoroethylene (solid content; 35 to 60 percent by weight), 6 to 21 percent by weight of organic solvent, and 1 to 5 percent by weight of anionic and/or non-ionic surface active agent.

12. The composite bearing material as recited in claim 11 in which said resin composition contains 2 to 3 percent by weight of the surface active agent having more than 12 carbon atoms.

* * * * *